April 1, 1941. V. B. WALLACE 2,236,656

DRAFTING MACHINE

Filed Feb. 12, 1940

INVENTOR.
VARD B. WALLACE
BY Harold W. Mattingly
ATTORNEY.

Patented Apr. 1, 1941

2,236,656

UNITED STATES PATENT OFFICE 2,236,656

DRAFTING MACHINE

Vard B. Wallace, Sierra Madre, Calif., assignor to Security-First National Bank of Los Angeles, Los Angeles, Calif.

Application February 12, 1940, Serial No. 318,491

6 Claims. (Cl. 33—79)

My invention relates to drafting machines and has particular reference to a new and improved construction of the device disclosed in my Patent No. 2,051,115, issued August 18, 1936.

In the art of drafting it is common practice to use drafting machines which will support one or more straight edges or scales in such manner that though they may be moved to various positions over the drawing board or drawing paper, the straight edges may be maintained at a fixed angle relative to a base line on the drawing board. The fixed angular relation between the scales and the base line is maintained by a parallel mechanism, two types of which are in common use; namely, the "parallel rod type" and the "band and pulley type."

In both of these types of machines it is common practice to mount the scales or straight edges upon a scale support which is in turn mounted upon the frame to permit of its rotation relative thereto and to thus permit the straight edges or scales to be set at any desired angle relative to the base line and when so set thereafter maintain that same angular position during all movements of the scales or straight edges over the board.

Protractors are also usually provided upon the frame and scale support arranged in such manner as to permit the ready selection of any desired angular relation between the scales and the base line. Again, it is common practice in these machines to provide pawls or spring pressed latching devices receivable in notches or holes when the scales are set at certain commonly employed angles relative to the base line and to permit adjustment of the angular position of the scales by retraction of the pawl, rotation of the scale supporting plate, and the insertion of the pawl in a newly selected one of the notches or holes. It frequently occurs, however, that the particular angle at which it is desired to set the scales or straight edges does not coincide with the position of any of the notches or holes and under such circumstances it is desirable that the pawl or latch be locked in a retracted position so that the scale support may be moved to other angular positions without the pawl entering or engaging one of the notches.

One of the primary difficulties which has been encountered in the use of such drafting machines having adjustment for the angular positions of the scales has been that the pawls and releasing devices employed for releasing the pawls from their notches have been so inconveniently and awkwardly located that it has been necessary for the draftsman using the machine to drop pencils, dividers, or other instruments which he is then using and to employ both hands for the adjustment or re-positioning of the scales and frame.

I have described and claimed in my copending application Serial No. 249,889, filed January 9, 1939, a number of forms of a drafting machine construction designed to overcome this and other heretofore encountered disadvantages. Each of the pawl release devices disclosed and claimed therein is fitted with a means to permit the locking of the pawl in a disengaged position, this pawl locking means being so constructed, however, as to either require the actuation of a separate locking device or the movement of the release device through a different path of movement than that employed in the pawl releasing operation to effect a locking of the pawl in its disengaged position. This form of construction requires a drafting machine operator to perform two separate operations in order to release the pawl and lock it in its released position and while this is advantageous in certain types of work, it is a definite disadvantage as regards certain other types of drafting operations.

The present invention is directed to an improved form of pawl release and locking device and it is accordingly an object of my invention to provide a drafting machine construction with a pawl release device which is so located as to be operated by the same hand of an operator as is used to manipulate the machine and which may be moved directly from an engaged position to a position in which the pawl is released and locked in such released position.

It is also an object of my invention to provide a drafting machine construction of the character set forth in which the control device for effecting the release of the pawl is movable in an unbroken path from an engaged to a released position and which may be moved further along this same path to effect a locking of the pawl in such released position.

It is a still further object of my invention to provide an apparatus of the character set forth in the preceding paragraphs in which a spring is provided for normally urging the pawl into an engaged position, together with a control means which is movable to a released position disengaging the pawl from the notches such that the spring tends to hold the control means in such released position.

Other objects and advantages of my invention will be apparent from a study of the following specifications, read in connection with the accompanying drawing, wherein.

Figure 1:
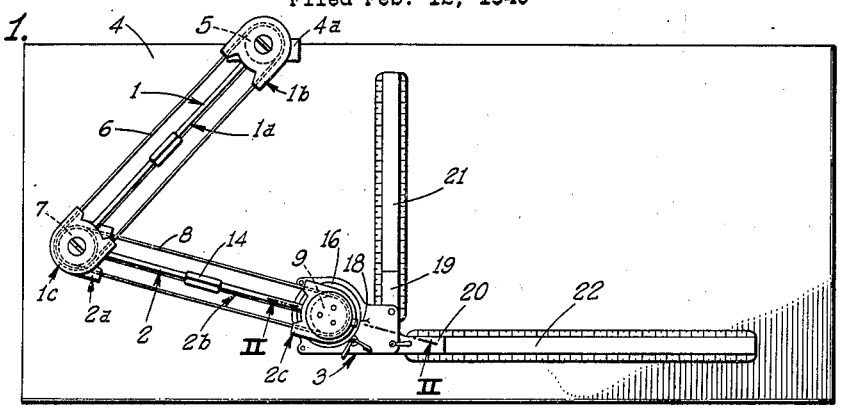
Fig. 1 is a plan view illustrating one form of the protractor head of my invention as being employed on a drafting machine of the endless band type.

Referring to the drawing, I have illustrated in Fig. 1 a typical "endless band" type of drafting machine which includes a pair of arms 1 and 2 upon one end of which is mounted a drafting machine head 3, the other end of the jointed arms 1 and 2 being secured to the upper edge of a drawing board 4 by means of a suitable clamp 4a. The arm 1 includes a strut 1a upon one end of which is carried a pivot head 1b and upon the opposite end of which is carried another pivot head 1c. The pivot head 1b is mounted upon the mounting clamp 4a in such manner that the strut 1a may be moved pivotally thereabout in a plane parallel to the surface of the board. A pulley 5 rigidly secured to the bracket 4a constitutes one of a pair of pulleys about which an endless band or belt 6 extends, the other pulley 7 of the pair being rotatably mounted upon the pivot head 1c of the arm 1.

The arm 2 likewise includes a pivot head 2a pivotally connected to the head 1c of the arm 1 for rotation relative thereto in a plane parallel to the board, the head 2a being mounted at one end of a rod 2b, the opposite end of which carries a pivot head 2c affording a supporting connection for the drafting machine head 3. A second endless band or belt 8 extends about a pair of pulleys on the arm 2, one of these pulleys indicated at 9 being rotatably mounted upon the head 2c while the other may be the same pulley 7 which forms a part of arm 1. Thus as either or both of the arms or struts 1 and 2 are moved over the board the pulley 9 will always maintain a fixed angular position relative to a base line on the board.

Figure 2:
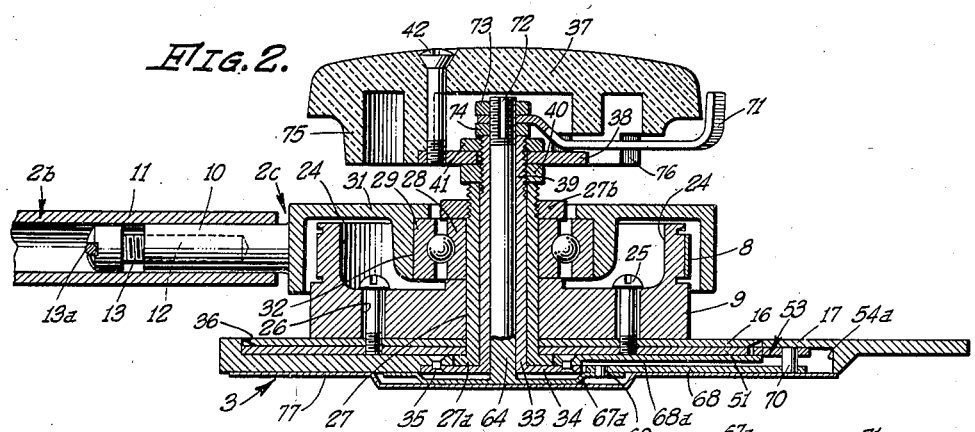
Fig. 2 is a vertical section taken substantially along the line II—II of Fig. 1 and illustrating the construction of the protractor head shown in Fig. 1.

I prefer to provide, as is illustrated in Fig. 2, a means associated with the struts 1a and 2b for lengthening or shortening these struts to effect a tightening of the endless bands 6 and 8. The head 2c is accordingly provided with a cylindrical shank 10 over which a tubular end portion 11 of the strut 2b may be placed. The shank 10 is drilled and tapered, as indicated at 12, to receive an adjusting screw 13 which is nonrotatably secured within the interior of the tubular portion 11 as by means of a key 13a. Thus rotation of the strut 2b will likewise effect a rotation of the screw 13 so as to lengthen or shorten the distance between the pivot heads 1c and 2c. If desired, a knurled or hexagonal portion 14 may be formed upon the strut 2b to facilitate the turning thereof. A similar construction may be embodied in the arm 1 to provide for the adjustment of the tension of the band 6.

It will be observed that the structure just described will operate to maintain the pulley 9 in a fixed angular position relative to the drawing board 4 as it is moved thereover, so that scales or straight edges secured to the pulley 9 will also be maintained in a fixed angular relation to the drawing board.

I provide a protractor plate 16 which is securely attached to the pulley 9 and a head plate 17 which is mounted coaxially with the protractor plate 16 and supported for rotation relative thereto. The head plate 17 may be provided with a protractor index 18 and fitted with suitable mounting members 19 and 20 for removably supporting drafting scales or straight edges 21 and 22 which are preferably disposed at right angles to each other.

Figures 3, 4:
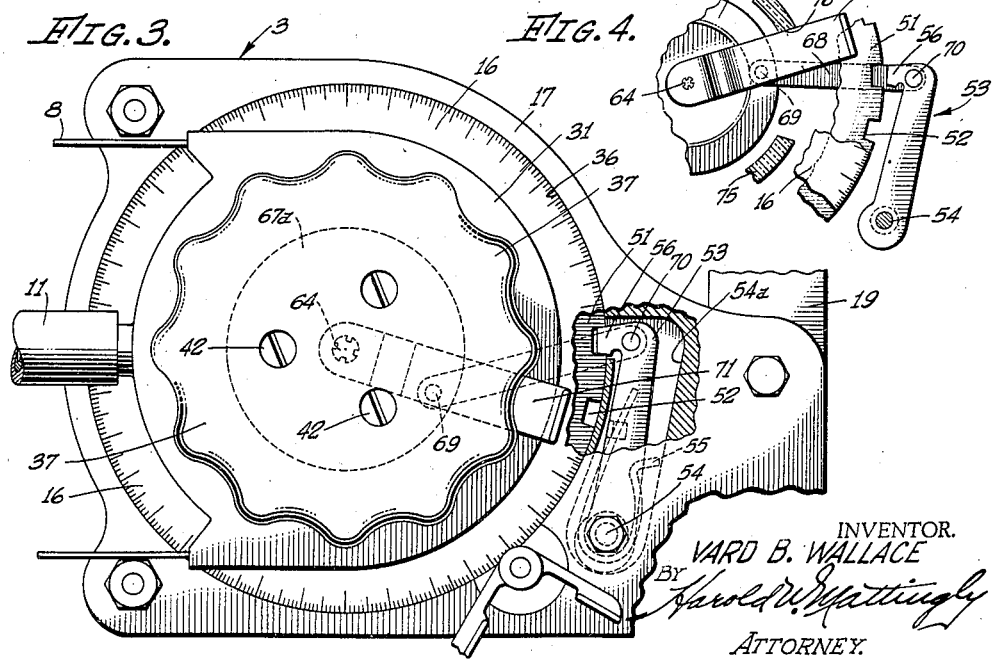
Fig. 3 is an enlarged plan view of the protractor head with certain parts broken away to show the construction of the release mechanism.
Fig. 4 is a schematic view illustrating the relation between the parts when the pawl is released and locked in its released position.

As illustrated in Figs. 2 and 3 the pulley 9 may be rigidly secured to the protractor plate 16 by providing a recess 24 therein which will accommodate the protruding portion of an attaching means which, as shown in Fig. 2, may comprise machine screws 25 passed through suitable openings 26 in the body portion of the pulley 9 and threadedly engaged with the protractor plate 16. The assembled pulley 9 and protractor plate 16 may be secured on a sleeve 27 which extends upwardly from the protractor plate 16 as by providing a hub 27a for engaging the under side of the protractor plate 16. An inner race 28 of a ball bearing is preferably mounted on the central portion of the sleeve 27 and an outer race 29 of said bearing is secured in a fixed position relative to a body portion 31 of the shank 10 as by providing a press fit between the outer race 29 and a recess 32 provided therefor. I provide a nut 27b which is threaded upon the upper end of the sleeve 27 and arranged to clamp the inner race 28, the pulley 9 and the protractor plate 16 between said nut and the hub 27a so as to securely lock each of these elements in a fixed position relative to each other.

In order that the head plate 17 and the scales 21 and 22 attached thereto may be rotatably mounted with respect to the protractor plate 16 to permit the scales to be adjusted or set in different desired angular positions relative to the drawing board 4, I provide another sleeve 33 which is inserted within the aforementioned sleeve 27 and adapted to rotate therein. The sleeve 33 may be provided with a flanged base portion 34 which is secured to the plate 17 as by means of headless rivets 35. The head plate 17 is provided with a circular recess 36 adapted to contain the protractor plate 16 so that the upper surfaces of the protractor plate 16 and the head plate 17 may lie in the same plane while the body portion of the head plate 17 may pass under the protractor plate 16 and into connection with the flanged portion 34.

To assist the draftsman in moving the scales over the board 4 and to make such rotational adjustment between the scales and the pulley 9 as he may desire, I provide a handle or control knob 37 securely attached to the upper end of the inner sleeve 33 as by providing a mounting plate 38 which may be threadedly engaged with a threaded upper portion 39 and locked in the desired position by means of jamb nuts 40 and 41, the control knob 37 being attached to the mounting plate 38 as by means of machine screws 42 inter-engaging these two members. An operator may, by grasping the knob 37, rotate the head plate 17 relative to the protractor plate 16 so as to establish any desired angular relation between the scales 21 and 22 and the drawing board 4.

In order that the protractor plate 16 and the head plate 17 may be automatically secured in a fixed position relative to each other at certain specified and frequently used angular settings and to accurately establish these angular settings without requiring great care in operation, I provide a spring actuated locking device for accurately locating the head plate 17 relative to the protractor plate 16 at such angular positions and for holding these plates in such positions. This mechanism may include a notch plate 51 which is disposed immediately below the protractor plate 16 and securely attached thereto by the aforementioned fastening means 25. The notch plate 51 is provided with a plurality of notches 52 disposed about the periphery of the notch plate in such location that when said notches register with a pawl 53 carried by the head plate 17, the scales 21 and 22 will occupy one of the aforementioned frequently used angular positions, such as parallel to the edges of the drawing board 4 and at angles of 15, 30, 45, 60 and 90 degrees relative thereto.

The pawl 53 is pivotally secured to the head plate 17 as by means of a pin or bolt 54 and confined in a recess 54a provided therefor in the head plate 17. The pawl 53 may be normally urged toward the notch plate 51 by means of a spring 55 so that whenever the head plate 17 is rotated to a position such that a notch engaging end 56 of the pawl 53 registers with one of the notches 52, the pawl 53 will be urged into engagement with that notch to intertie the plate 17 to the notch plate 51 and to the protractor plate 16 attached thereto.

In order that the pawl 53 may be readily and easily disengaged from the notch plate 51 by a draftsman employing the machine and in order that such disengagement may be effected through the draftsman's use of the same hand as he uses to rotate the control knob 37, I provide a mechanism which includes a shaft 64 inserted within the inner sleeve 33 and which is rotatable relative thereto. The shaft 64 is provided on its lower end with a crank means illustrated herein as a flange 67a disposed immediately below the previously described flange portion 34, the crank 67a being operably connected to the pawl 53 as by means of a link 68 pivotally secured to the crank or peripheral portion of the flange 67a as by means of a pivot pin 69 and to the pawl 53 near the notch engaging end 56 thereof as by means of a pivot pin 70.

It will be observed that with this arrangement a rotation of the shaft 64 will effect a corresponding rotational movement of the crank 67a, the link 68 operating to translate this rotary motion into a movement of the pawl 53 out of engagement with the notch 52 in which it may be received.

In order that rotation of the shaft 64 may be effected by an operator employing the same hand as is used to grasp the knob 37, I provide a control means 71 in the form of a lever which is secured at one end to the shaft 64 as by means of a splined inter-engagement 72. The lever 71 may be locked against axial movement relative to the shaft 64 as by employing a pair of lock nuts 73 and 74 threadedly engaged with the upper end of the shaft 64. A lower or skirt portion 75 of the handle 37 is preferably notched as indicated at 76 in Fig. 2 to provide a recess within which the lever 71 may be oscillated, the ends of the recess 76 serving as positive stops to define the limits of oscillatory movement which may be imparted to the lever 71. These limits are hereinafter defined as a braking or engaged position, referring to the engagement of the pawl 53 with the notches 52, and a disengaged or released position, referring to the condition wherein the notch engaging end 56 of the pawl 53 is withdrawn from the notches 52.

As is illustrated in Figs. 3 and 4, I prefer to locate the pivot point 69 in such manner that when the lever 71 occupies the released position the pivot point 69 will lie on one side of a line joining the center of the shaft 64 with the pivot point 70 carried by the pawl 53 and such that when the lever 71 is moved to the released position the pivot point 69 will lie on the opposite side of this line of centers but very closely adjacent thereto. Thus when the lever 71 is moved from the engaged position, as illustrated in Fig. 3, to the disengaged or released position, as illustrated in Fig. 4, the pivot point 69 will be moved past a dead center position at the time the pawl 53 is moved out of engagement with the notch plate 51. The force of the spring 55 which tends to urge the pawl 53 into a notch engaging position thus tends to rotate the lever 71 further in the same direction, this further movement being arrested, however, by the engagement of the lever 71 with the end of the notch 76 through which it is passed so that the pawl 53 is, by this means, held or locked in a position out of engagement with the notch plate 51. This mechanism thus constitutes an "over-center" mechanism in which the spring 55 operates to hold the control lever in whichever position it is placed by the operator.

It will be observed that by this means an operator may also move the lever 71 from the engaged position, as illustrated in Fig. 3, to a position bringing the pivot point 69 nearly but not quite to the line of centers joining the shaft 64 and pivot 70, thus releasing the pawl 53 from the notch plate 51 so that the scales may be rotated to a new angular position, the release of the lever 71 permitting the spring 55 to restore the pawl 53 to a notch engaging position as soon as the head plate 17 has been rotated to a position bringing the pawl and one of the notches into registration with each other. On the other hand, the operator, if he desires, may move the lever 71 the full limit of travel which is permitted by the notch 76 and by this operation move the pawl 53 to a disengaged position and lock it in such position until such time as the lever 71 is manually moved back toward the engaged position.

It will thus be apparent that a drafting machine operator may have a selected control over the release of the pawl 53 such that automatic re-engagement of the pawl 53 with the next notch in the notch plate 51 may be obtained or such that the pawl may be held out of engagement with the notch plate 51 for as long as is desired.

I prefer to enclose the aforementioned mechanism to prevent the ingress of dust, dirt, and similar foreign particles and for this purpose I provide a bottom cover plate 77 which is disposed below the head plate 17 and attached thereto in any suitable manner.

From the foregoing it will be observed that I have provided an improved drafting machine construction wherein the control device for effecting the release of the pawl from the notch plate is arranged to be moved in a fixed path of movement and in which the parts are so arranged that a movement of the release device along this path from an engaged position will effect the disengagement of the pawl from the notch plate, while a further movement along the same path will cause the pawl to be locked in a disengaged position against automatic return to an engaged position.

It will be, furthermore, observed that the arrangement of parts employed is such that this operation may be effected by the same hand of an operator as is used to manipulate the drafting machine.

While I have shown and described the preferred embodiment of my invention, I do not desire to be limited to any of the details of construction shown or described herein, except as defined in the appended claims.

I claim:

1. In combination with a drafting machine including a head member having a tool member pivotally secured thereto and a device for securing said members against relative pivotal movement comprising a pawl mounted on one of said members for movement from a position engaging the other of said members to a position disengaged therefrom, a pawl control device including: shaft means supported for rotary movement relative to said head member and relative to said tool member; control means coupled to one end of said shaft for rotating said shaft; means inter-coupling the other end of said shaft with said pawl for translating rotary movement of said shaft into movement of said pawl from said engaged to said disengaged position; and means coacting with said pawl and responsive to movement of said shaft beyond a position corresponding to said disengaged position for locking said pawl in said disengaged position.

2. In combination with a drafting machine including a head member having a tool member pivotally secured thereto and a device for securing said members against relative pivotal movement comprising a pawl mounted on one of said members for movement from a position engaging the other of said members to a position disengaged therefrom and having a spring means normally urging said pawl toward said enaged position, a pawl control device including: shaft means supported for rotary movement relative to said tool member; control means coupled to one end of said shaft for rotating said shaft between a securing and a locked position; a crank on the other end of said shaft; a link connected to said pawl; pivot means connecting said link to said crank to translate movement of said shaft between said securing and locked positions into movement of said pawl between said engaged and disengaged positions, said pivot means being so disposed as to lie on one side of a line joining the axis of said shaft with the point of connection of said link with said pawl when said shaft is in said securing position and so disposed as to lie on the other side of said line and closely adjacent thereto when said shaft is in said locked position; and stop means for preventing movement of said shaft beyond said locked position.

3. In combination with a drafting machine including a head member having a tool member pivotally secured thereto and a device for securing said members against relative pivotal movement comprising a pawl mounted on one of said members for movement from a position engaging the other of said members to a position disengaged therefrom and having a spring means normally urging said pawl toward said enaged position, a pawl control device including: shaft means supported for rotary movement relative to said head member and relative to said tool member; control means coupled to one end of said shaft for rotating said shaft from a securing to a released position and beyond to a locked position; stop means for preventing movement of said shaft beyond said locked position; a crank on the other end of said shaft; a link connected to said pawl; and pivot means connecting said link to said crank to translate movement of said shaft between said securing and released positions into movement of said pawl between said engaged and disengaged positions, the relative positions of said crank, link and pawl being such as to dispose said pivot means on one side of and spaced from a line joining the axis of said shaft with the point of connection of said link with said pawl when said shaft is in said securing position and such as to dispose said pivot means on the same side of the same line but closely adjacent thereto when said shaft is in said released position, whereby movement of said shaft to said locked position disposes said pivot means on the other side of said line and closely adjacent thereto and prevents said spring means from moving said pawl to said engaged position.

4. In combination with a drafting machine including a head member having a tool member pivotally secured thereto and a device for securing said members against relative pivotal movement comprising a pawl mounted on one of said members for movement from a position engaging the other of said members to a position disengaged therefrom, a pawl control device including: a control member on said head; bearing means mounting said control member on said head for pivotal movement between a securing and a locked position; a link connected to said pawl; and pivot means connecting said link to said control member to translate movement of said control member between said securing and locked positions into movement of said pawl between said engaged and disengaged positions, said pivot means being so disposed as to lie on one side of a line joining the axis of said bearing means with the point of connection of said link with said pawl when said control member is in said securing position and so disposed as to lie on the other side of said line and closely adjacent thereto when said control member is in said locked position.

5. In combination with a drafting machine including a head member having a tool member pivotally secured thereto and a device for securing said members against relative pivotal movement comprising a pawl mounted on one of said members for movement between a position engaging the other of said members and a position disengaged therefrom, a pawl control device including: a spring means constantly urging said pawl toward said engaged position; a control member supported on said head for movement in one direction from a released position to a locking position and for movement in an opposite direction; means interconnecting said control member with said pawl for moving said pawl from said disengaged position toward said engaged position upon movement of said control member in either of said directions; and stop means for stopping the movement of said control member in said one direction at said locked position, said stop means being so located that said pawl is stopped in its movement before said engaged position is reached, whereby the force applied to said pawl by said spring means serves to hold said control member against said stop.

6. In combination with a drafting machine including a head member having a tool member pivotally secured thereto and a device for securing said members against relative pivotal movement comprising a pawl mounted on one of said members for movement from a position engaging the other of said members to a position disengaged therefrom, a pawl control device including: spring means constantly urging said pawl toward said engaged position; a control member mounted on said head for movement in one direction from a released position to a locking position and for movement in an opposite direction; a mechanism interconnecting said control member with said pawl for translating movement of said control member in either of said directions into movement of said pawl from said disengaged toward said engaged position, said mechanism comprising a member coupled to said pawl and engaged with said control member at such point that the force applied thereto by said spring means is normal to the direction of movement of said control member when in its released position and at an acute angle thereto when said control member is moved from said released position; and stop means for stopping the movement of said control member in said one direction at said locked position, said stop means being so located that said pawl is stopped in its movement before said engaged position is reached, whereby the force applied to said pawl by said spring means serves to hold said control member against said stop.

VARD B. WALLACE.